Dec. 28, 1965
H. G. SPANGLER
3,226,491
TELEPHONE SWITCH CONTROL DEVICE
Filed Dec. 4, 1961
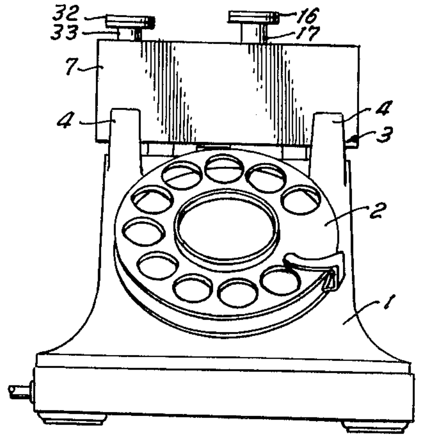
Fig. I
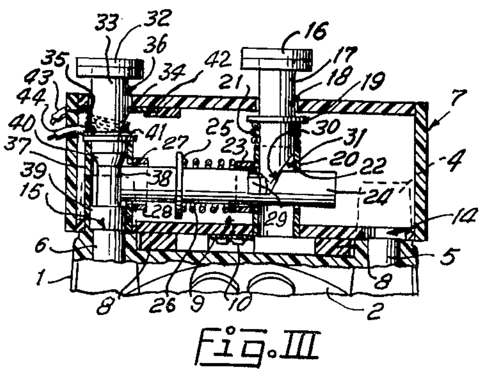
Fig. III
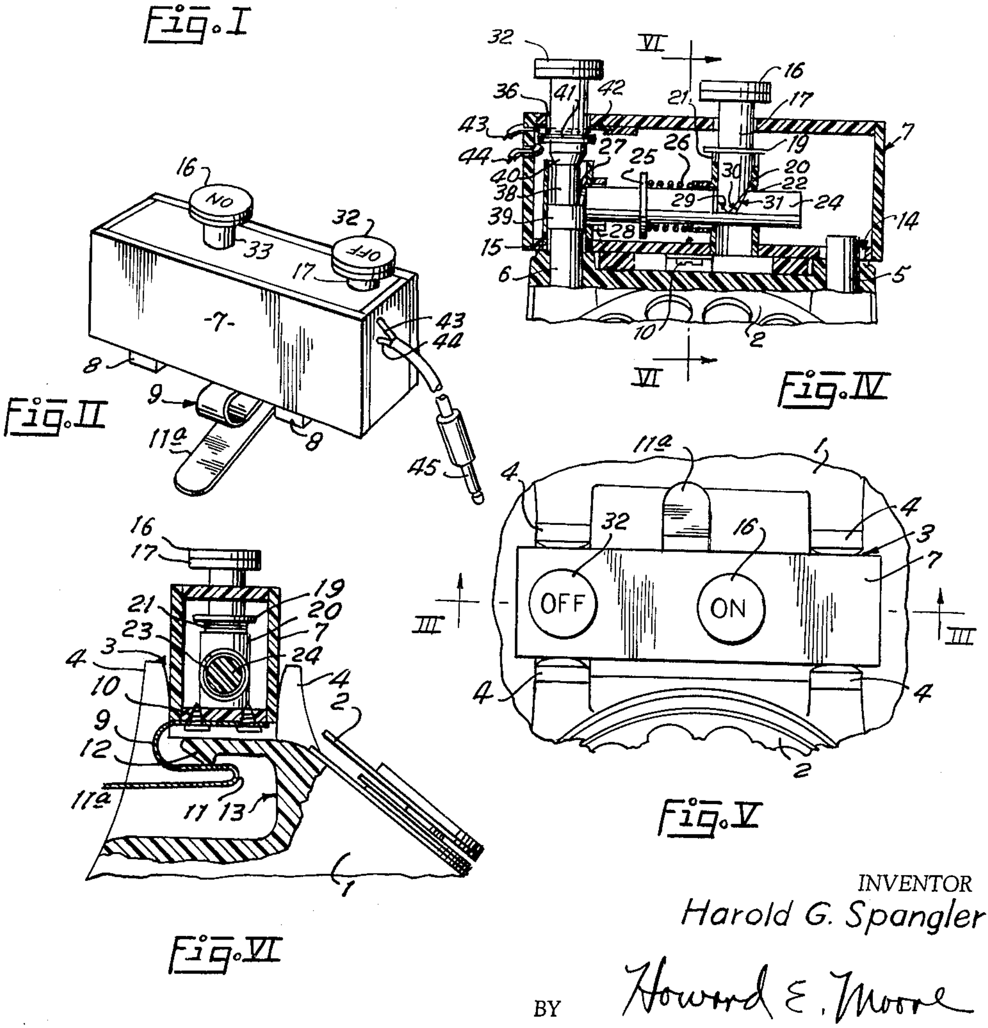
Fig. II, Fig. IV, Fig. V
Fig. VI
INVENTOR
Harold G. Spangler
BY Howard E. Moore
ATTORNEY 3,226,491
TELEPHONE SWITCH CONTROL DEVICE Harold G. Spangler, 1207 Haines Ave., Dallas, Tex.

Filed Dec. 4, 1961, Ser. No. 156,781
1 Claim. (Cl. 179—161)

This invention is concerned with a push button type control device for depressing and releasing a spring urged plunger, such as employed in a telephone receiver instrument, but could be employed in any application for depressing, holding down, and releasing a spring urged plunger which controls a switch, valve or other device.

The particular embodiment of the invention disclosed herein is designed for employment with a telephone receiving instrument, for depressing, holding down and releasing by push button controls, the spring urged pins on the telephone instrument extending upwardly in the cradle thereof.

Such spring urged pins are normally held down to open the circuit in the telephone instrument, by the weight of the telephone receiver, and such spring urged pins are freed to move upwardly to close the telephone circuit when the receiver is removed from the cradle.

Auxiliary amplifier units are widely used in conjunction with telephones wherein a speech amplifier is incorporated in a suitable housing with a speaker as a component part thereof. Such amplifier units customarily have a spring urged plunger thereon positioned in a cradle so that the telephone receiver may be removed from the cradle on the telephone instrument, closing the circuit of the telephone instrument, and placed upon the cradle of the amplifier unit, pressing down the spring urged switch control plunger on the amplifier unit to energize the amplifier unit, so that sound received through the telephone receiver may be picked up and amplified by the amplifier unit, whereby the user can hear the amplified received signal through the amplifier without placing the telephone receiver to his ear, and the speech of the user is picked up by the receiver and fed through the telephone instrument to the telephone circuit.

The above indicated procedure requires that the user pick up the receiver on each incoming call and place it upon the cradle of the amplifier unit in order to utilize the amplifier unit, and in order to place a call it is necessary that the receiver be picked up from the telephone unit to close the telephone circuit and place the receiver upon the cradle of the amplifier unit. Upon completion of the call, the receiver must again be removed from the cradle of the amplifier unit and placed upon the cradle of the telephone receiver unit in order to open the circuit of the telephone instrument.

This obviously results in considerable lost motion and inconvenience.

The present invention is concerned with a push button control unit attachable to the cradle of a telephone receiver in such a manner that the spring urged plungers controlling the switch in the telephone can be pushed down, held down and released by push button controls extending upwardly therefrom so that the receiver can be taken off the cradle, placed on the cradle of the auxiliary amplifier unit, and the control device attached to the cradle of the telephone receiver so that the placing and reception of calls through the amplifier unit can be accomplished without the necessity of repeatedly exchanging the receiver between the cradle of the telephone unit and the cradle of the auxiliary amplifier unit.

It is, therefore, a primary object of the invention to provide a push button control unit for pushing down, holding down and releasing a spring urged plunger, or plungers.

Another object of the invention is to provide a push button control unit having two control plungers therein controllably interconnected by a transverse shaft in such a way that the depression of one control plunger releases the other, whereby a spring urged element underneath the second named control plunger may move same upwardly to close a circuit controlled by such spring urged element.

Still another object of the invention is to provide a push button control unit attachable to the cradle of a telephone receiver instrument, having a vertically disposed plunger therein engageable with one of the spring urged switch control buttons of the telephone to hold same down, and another spring urged plunger therein arranged to coact with a transverse control shaft in such manner as to pull the control bar out of engagement with the first named plunger to release same to thereby allow the spring urged telephone switch control buttons to move upwardly to close the switch in the telephone instrument.

Another object of the invention is to provide a spring attachment on such a telephone switch control device which may be easily attached to the upper lip of the hand hold recess on the telephone receiver unit in position so that it can be readily released.

A still further object of the invention is to provide a switch for turning the power on and off in the amplifier unit which is opened by the push button control.

Other and further objects of the invention will become apparent upon reading the detailed specification hereinafter following, and by referring to the drawing annexed hereto.

A suitable embodiment of the invention is shown in the attached drawing wherein:

FIGURE I is a front elevational view of a telephone receiver unit with the control device, constituting the subject matter of the invention, positioned within the cradle thereof;

FIGURE II is a front perspective view of the control device;

FIGURE III is a cross-sectional, elevational view taken on the line III—III of FIGURE V;

FIGURE IV is a view similar to FIGURE III showing the push button control after the "on" button has been pushed downward to release the "off" button control;

FIGURE V is a top plan view of the control device attached within the cradle of a telephone receiver instrument; and FIGURE VI is a transverse, cross-sectional elevational view taken on the line VI—VI of FIGURE IV.

Numeral references are employed to designate the various parts shown in the drawings, and like numerals indicate like parts throughout the various figures of the drawings.

The numeral 1 indicates a conventional telephone receiver instrument, having a dial 2 thereon and a receiver cradle 3 on the upper side thereof formed by the upstanding legs 4.

The upstanding spring urged switch buttons 5 and 6 extend upwardly through the housing of the telephone receiver unit within the cradle 3. Said buttons 5 and 6 are normally spring-urged upwardly so that the weight of a telephone receiver (not shown), when disposed in the cradle 3, will normally hold the switch buttons 5 and 6 in retracted position against the spring elements urging them outwardly, so that the buttons contact and hold a switch element within the telephone receiver unit 1 in open position. However, when the telephone receiver is lifted from the cradle 3, the buttons 5 and 6 are allowed to move upwardly by spring action, thereby closing the switch within the telephone receiver unit 1, connecting the telephone receiver electrically with the telephone circuit so that a message can be received through the telephone receiver or the telephone may be dialed to connect the receiver with another receiver unit in a remote location.

The push button control unit constituting the subject matter of this invention is indicated generally at 7, and includes a housing made of suitable material, such as plexiglas, or molded plastic which, as shown, is generally rectangular in shape, having ends, side, top and bottom walls.

A pair of spacer lugs 8 are secured to the underside of the bottom wall of the housing 7, so as to suitably space the housing 7 from the inner surface of the cradle 3 as may be desired.

A spring clip, generally indicated at 9, is secured to the lower surface of the bottom wall of the housing 7 by means of screws 10, and includes a reverse portion 11 having an outwardly extending engaging portion 11*a*, whereby the inwardly urged reverse lip 11 will be sprung outwardly by pressing upwardly on the engaging portion 11*a*, to permit the reversely turned lip 11 to be slid over the lip 12 of the handhold recess 13, provided on the conventional telephone instrument 1. The spring urged lip 11 presses against the lip 12 to hold the control unit 7 between the cradle 3 as clearly shown in FIGURE VI.

To remove the control unit 7 from the telephone, it is simply necessary to press upwardly on the engaging extension 11*a*, to move the reversely turned lip 11 away from the lip 12 to allow the control unit 7 to be moved upwardly out of the cradle 3.

Passages 14 and 15 are provided through the lower wall of the housing 7, arranged to receive the telephone switch buttons 5 and 6 in the manner hereinafter described.

The on button 16 has a shaft or plunger 17 extending therefrom, and through an opening 18 in the upper wall of the housing 7.

An annular flange 19 is secured about the shaft 17, which is arranged to engage the underside of the upper wall of the housing 7 to limit the outward movement of the shaft 17 through the passage 18.

The shaft 17 extends into the tubular support and guide 20, which is secured to, and extends upwardly from, the lower wall of the housing 7.

The upper end of the tubular support 20 provides a stop and support for the spring 21 which is positioned about the shaft 17, below the flange 19. The flange 19 serves as a support and stop for the other end of the spring 21.

A lateral passage 22 is provided through the tubular support 20, and the actuator pin 24 slidably extends through the lateral passage 22.

A tubular spring stop and guide 23 surrounds the lateral passage 22, and the transverse actuator pin or shaft 24 slidably extends therethrough.

A coil spring 26 is positioned about the shaft 24, and is abutted at one end against the spring stop 23 and at the other end against the annular flange 25 secured to the actuator pin 24.

A passage 27 is formed through the wall of the guide sleeve 37, and an outwardly extending annular sleeve 28 is secured to the wall of the guide sleeve 37 about the passage 27. The inner end of the actuator pin 24 slidably extends through the sleeve 28, and the passage 27, so as to be engageable with the shank 33 of the off button 32 in the manner hereinafter described.

A slot 29 is formed in the upper surface of the actuator pin 24. The slot 29 is provided with a beveled surface 30 at the outer end thereof, which co-acts with a beveled surface 31 on the lower end of the plunger 17, so that when the on button 16 is pushed downwardly against the spring 21, a camming action occurs between the surfaces 30 and 31 to move the actuator pin 24 to the right as shown in FIGURE III. It will be noted that the surfaces 30 and 31 are disposed at different angles, so that a leverage is attained to move the shaft 24 when the surfaces are moved toward each other.

The off button 32 has a shank 33 extending therefrom through a passage 36 provided through the upper wall of the housing 7.

A guide sleeve 37 is secured at its lower end in the passage 5 through the lower wall of the housing 7, the said guide sleeve being arranged to slidably receive the lower end of the plunger 33.

An annular flange 34 is secured about the plunger 33, and is arranged to come into contact with the upper end of the guide sleeve 37 to limit the inward movement of plunger 33 upon depressing the off button 32.

A spring 35 is positioned about the plunger 33 between the flange 34 and the upper wall of the housing 7, said spring 35 being provided for the purpose of absorbing the shock of the rapid upward movement of the shank 33 upon the release thereof by pressing on the on button 16 in the manner hereinafter described.

The spring 35 also provides an electrical connection between the metallic plates 41 and 42 secured to the upper surface of flange 34 and the undersurface of the top of housing 7, respectively, when the on button 16 is pushed, as will be hereinafter described.

Electric leads 43 and 44 connect to conductor strips 42 and 41, respectively, extend through the wall of housing 7, and are connected to a jack 45 which may be plugged into the amplifier unit (not shown) to close the circuit therein when the on button is pushed in the manner hereinafter described. By such means the power in the amplifier unit is only on when the on button 16 is pushed, thus conserving the battery in the amplifier unit when the telephone is not in use.

An annular groove 38 is formed about the shaft 33, which provides a lower end 39 having a straight upper shoulder thereon and an annular conical surface 40 at the upper end thereof which serves as a guide for guiding the inner end of the actuator pin 24 into the groove 38.

The operation and function of the control device is as follows:

The housing 7 is attached to the telephone instrument 1, by positioning it within the cradle 3, and engaging the spring member 9 with the lip 12 of the telephone instrument in the manner hereinbefore described.

When the control device is positioned on the telephone, the on and off buttons are in the position shown in FIGURE III, so that the lower end of the shank 33 engages the switch button 6, depressing same, together with the switch button 5, causing the telephone circuit to be open. In this position it will be noted that the upper end of spring 35 does not contact the conductor strip 42 so that the electrical circuit in the amplifier unit is also open.

The receiver for the telephone has been previously removed from the cradle 3, and placed upon the cradle of an amplifier unit (not shown).

When it is desired to close the telephone circuit to answer a call or to dial, the on button 16 is depressed. This causes the actuator pin 24 to move to the right by reason of the coaction between the cam surfaces 30 and 31, which withdraws the outer end of the actuator pin 24 from the annular groove 38, freeing the shaft 24 from groove 38 of the off button shaft 33, thereby allowing the spring urged switch button 6 to push the pin 34 upwardly as shown in FIGURE IV.

The outer end of the actuator shaft 24 engages the enlarged portion 39 of the shaft 33, and is spring urged thereagainst by the spring 26. The upward movement of the shank 33 is cushioned by the spring 35, as shown in FIGURE IV, to prevent noise which would be occasioned by the flange 34 striking the upper wall of the housing 7. The spring urged button 6 holds the off button shaft 33 in upward position, as shown in FIGURE IV, and in such position the telephone circuit is closed. In such position the spring 35 makes contact between conductor strips 41 and 42 thereby closing the electrical circuit in the amplifier unit and energizing same. It will be noted that the telephone switch button 5 moves upwardly into the passage 14 when actuated as described.

When pressure is released from the on button 16, the shaft 17 is returned to up position by the spring 21.

When it is desired to open the telephone circuit, the off button 32 is depressed which moves the shaft 34 downward, depressing the switch buttons 5 and 6. When the end of the actuator pin 24 comes into alignment with the groove 38, the spring 26 relaxes and moves the pin 24 to the left as shown in FIGURE III, causing the end thereof to enter the groove 38, thereby returning the elements of the control device to the position shown in FIGURE III wherein the telephone circuit is open or in off position, and the elements thereof are in position to reclose the telephone circuit by depressing the on switch button 16, in the manner hereinbefore described. It will be noted that in off position, the spring 35 is relaxed and does not make contact between contact strips 41 and 42.

It will be noted that when the elements of the control device are in the position shown in FIGURE III, the shaft 33 is secured against movement in either direction by virtue of the engagement of the end of actuator pin 24 with the straight shoulder at the lower end of the slot 28, and by reason of the engagement of the flange 34 with the upper end of the tubular guide member 37.

It will be understood that although the embodiment of the switch control device disclosed herein is particularly adapted for opening and closing the circuit in a telephone receiver, the same could be adapted for use in opening and closing circuits in other electrical, electronics or valve devices, wherein a spring urged button or plunger is depressed to open or close the circuit or valve.

It will be seen that I have provided a switch control device particularly usable with a telephone receiver unit, to open and close the circuit therein, and in an auxiliary unit by a simple push button control, which avoids the inconvenience of removing and replacing the telephone receiver from the telephone instrument cradle upon using an auxiliary amplifier device, and which is adaptable for use with other and further electrical, electronics, or valve devices employing a spring urged plunger, or plungers, to control the opening and closing of a circuit or valve.

It will be understood that other and further embodiments of my invention may be made without departing from the spirit and scope of the appended claims.

Having described my invention, I claim:

In a push button device arranged for attachment to a telephone instrument having a cradle with spaced spring urged switch buttons extending upwardly therein; a housing having spaced walls with passages therethrough; a first plunger movably extendable through one of the passages, and having an annular groove thereabout with an enlarged portion below the groove; one of said spring urged switch buttons being movably extendable through a passage in the lower wall of the housing and being engageable with the lower end of the first plunger; a transversely movable shaft disposed in the housing and having an end engageable in the groove; a second plunger movably extendable through one of the passages; contacting cam surfaces on the shaft and on the second plunger arranged to move the shaft out of engagement with the groove about the first plunger upon depressing the second plunger; spring means arranged about the shaft to urge the end of the shaft into engagement with the first plunger, whereby upon depressing the second plunger the end of the shaft will be moved out of engagement with the groove, and the spring urged switch button therebelow will move the first plunger upwardly to allow the outer surface of the enlarged portion thereon to engage the end of the shaft and prevent inward movement thereof; another passage through the lower wall of the housing arranged to receive the other switch button; and spring means arranged between the second plunger and the housing to urge the second plunger upwardly in the housing.

References Cited by the Examiner

UNITED STATES PATENTS

| | | | |
|---|---|---|---|
| 1,979,588 | 11/1934 | Vreeland | 200—5 |
| 2,098,771 | 11/1937 | Bogue | 200—61.58 |
| 2,140,655 | 12/1938 | Sloan | 200—61.58 |
| 2,311,322 | 2/1943 | Zimmerman | 200—5 |
| 2,338,757 | 1/1944 | Curran | 179—99 |
| 2,414,307 | 1/1947 | Johnson | 200—5 |
| 2,597,670 | 5/1952 | Pinto | 179—147 |

ROBERT H. ROSE, *Primary Examiner.*

ROBERT K. SCHAEFER, *Examiner.*